(12) United States Patent
Jin

(10) Patent No.: US 8,359,452 B2
(45) Date of Patent: Jan. 22, 2013

(54) IMAGE FORMING APPARATUS AND METHOD OF OVERWRITING FOR STORAGE UNIT IN IMAGE FORMING APPARATUS

(75) Inventor: Song-baik Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 12/504,788

(22) Filed: Jul. 17, 2009

(65) Prior Publication Data

US 2010/0077159 A1  Mar. 25, 2010

(30) Foreign Application Priority Data

Sep. 22, 2008 (KR) .................. 2008-92816

(51) Int. Cl.
*G06F 12/02* (2006.01)
(52) U.S. Cl. ........ 711/173; 711/151; 711/154; 711/170; 711/171
(58) Field of Classification Search ............ 711/156, 711/151, 154, 170, 171, 173
See application file for complete search history.

(56) References Cited

U.S. PATENT DOCUMENTS

| | | | |
|---|---|---|---|
| 2004/0117310 A1* | 6/2004 | Mendez et al. | 705/50 |
| 2006/0015741 A1* | 1/2006 | Carroll | 713/182 |
| 2007/0006170 A1* | 1/2007 | Hasse et al. | 717/131 |
| 2009/0259808 A1* | 10/2009 | Koren et al. | 711/103 |
| 2009/0282393 A1* | 11/2009 | Costa et al. | 717/132 |
| 2009/0292747 A1* | 11/2009 | Shapiro | 707/204 |

\* cited by examiner

*Primary Examiner* — Jae Yu

(57) ABSTRACT

An image forming apparatus and a method of overwriting for a storage unit in an image forming apparatus. The method of overwriting data in a storage unit of an image forming apparatus includes configuring a plurality of overwriting options corresponding to data stored in the storage unit; deleting the data stored in the storage unit according to a delete instruction; and overwriting data according to the configuration of the plurality of overwriting options corresponding to the data stored in the storage unit.

13 Claims, 5 Drawing Sheets

IMAGE FORMING APPARATUS AND METHOD OF OVERWRITING FOR STORAGE UNIT IN IMAGE FORMING APPARATUS

CROSS-REFERENCE TO RELATED APPLICATION

This application claims benefit of Korean Application No. 10-2008-0092816, filed Sep. 22, 2008, in the Korean Intellectual Property Office, the disclosure of which is incorporated herein by reference.

BACKGROUND OF THE INVENTION

1. Field of the Invention

Apparatuses and methods consistent with aspects of the present invention relate to an image forming apparatus and a method of overwriting for a storage unit in an image forming apparatus, and more particularly, to an image forming apparatus which configures an overwriting option for a storage unit and carries out overwriting according to the set-up overwriting option and a method of overwriting for a storage unit in an image forming apparatus.

2. Description of the Related Art

An image forming apparatus, realized by a printer, a copier, a fax or a multifunctional device, includes a storage unit, such as a hard disk drive (HDD), a memory card, and a universal serial bus (USB) device, provided inside or outside thereof.

A storage unit employed in an image forming apparatus generally requires security to prepare against the leakage of or the illegal access to stored data. In particular, the storage unit has the feature that even if a specific file is deleted, only information about the file location and file attributes and the link information pointing to the space where the file is stored are deleted but the file is not deleted at the space where it is stored, and thus the data can be recovered or restored.

Accordingly, in the image forming apparatus requiring security, overwriting is carried out at the space where a data is deleted in order to provide data security. Overwriting indicates that when data are deleted from the storage unit, writeover actions are repeatedly conducted with data being written on the space where the data are deleted. Here, the more times overwriting is carried out, the more difficult it becomes to recover or restore previously stored data.

Although, the number of overwrites improves the performance of data security, such requires a lot of time and slows the processing speed of the apparatus.

Furthermore, a conventional overwriting method applies the same number of overwrites to all data in the storage unit, even when the data does not require high security, and thus, an unnecessary load is placed on apparatus processing.

SUMMARY OF THE INVENTION

Accordingly, aspects of the present invention provide an image forming apparatus which configures a plurality of overwriting options for a storage unit and overwrites data in accordance with the configuration of the plurality of overwriting options corresponding to the data stored in the storage unit when the data is deleted to bring the decrease of unnecessary loads and the improvement in the processing speed of the apparatus, and a method of overwriting for a storage unit in an image forming apparatus.

Another aspect of the present invention provides a display apparatus reduced in cost and capable of sensing an external stimulus, and a control method thereof.

The foregoing and/or other aspects of the present invention can be achieved by providing a method of overwriting for a storage unit of an image forming apparatus may include configuring a plurality of overwriting options corresponding to data stored in the storage unit; deleting the data stored in the storage unit according to a delete instruction; and overwriting data according to the configuration of the plurality of overwriting options corresponding to the data stored in the storage unit.

The storage unit may include a plurality of partitions and the configuring of the plurality of overwriting options comprises configuring the overwriting options according to a partition where the data is stored.

The method may further include determining which of the plurality of partitions the data is to be stored according to a security level, wherein the security level is at least one of a level of importance and a kind of stored data.

The overwriting options may be configured differently for the different partitions.

The configuring the plurality of overwriting options may comprise configuring the overwriting options according to the kind of the stored data.

The plurality of overwriting options may include the number of times overwriting occurs.

The method further may include displaying the overwriting options configuration.

The plurality of overwriting options may be changeable by an administrator or a user.

The configuring the plurality of overwriting options may be carried out on a user interface of a host device.

The foregoing and/or other aspects of the present invention provide an image forming apparatus that may include: a storage unit storing data; a communication interface communicating with the storage unit; and a controller controlling a plurality of overwriting options corresponding to the stored data and overwriting the stored data according to the plurality of overwriting options corresponding to the stored data when the stored data is deleted according to a delete instruction.

The storage unit may include a plurality of partitions, and the controller configures the plurality of overwriting options according to a partition where the data is stored.

The controller may determine which of the plurality of partitions the data is to be stored in according to a security level which is at least one of an importance of the stored data and the kind of the stored data.

The plurality of overwriting options may be configured differently for the different partitions.

The controller may configure the plurality of overwriting options according to the kind of the data.

The plurality of overwriting options may include the number of times overwriting occurs.

The image forming may further include a display unit displaying the configuration of the plurality of overwriting options.

The plurality of overwriting options may be changeable by an administrator or a user.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
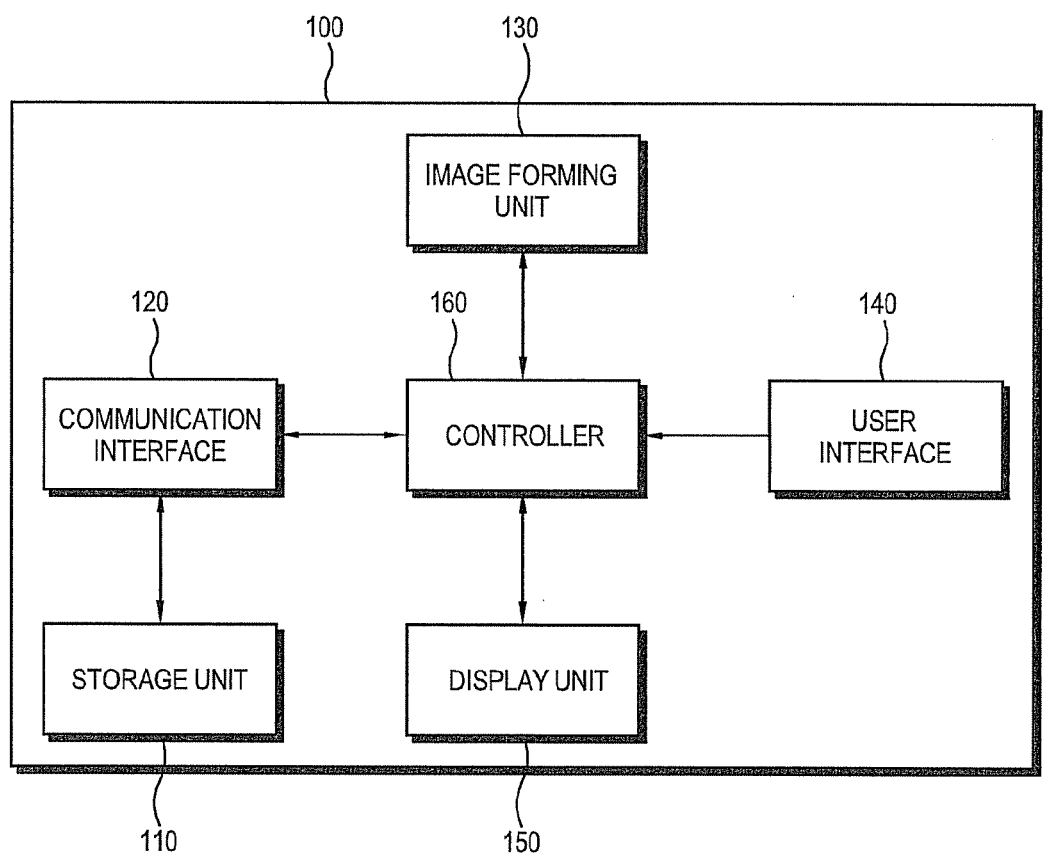
FIG. 1 is a block diagram to illustrate the configuration of an image forming apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating the configuration of an image forming apparatus 100 according to an exemplary embodiment of the present invention. The image forming apparatus 100 may be realized by a printer, a copier, a fax, a multifunctional device having two or more functions, or other similar devices.

As illustrated in FIG. 1, the image forming apparatus 100 includes a storage unit 110, a communication interface 120, an image forming unit 130, a user interface 140, a display unit 150 and a controller 160. The storage unit 110 includes a plurality of partitions where data are stored. The storage unit 110 includes either an HDD, a RAM, an NVRAM, or other such storage devices or a combination thereof, provided in the image forming apparatus 100 either a memory card, a USB memory, or other such memory devices or a combination thereof, that are a portable storage medium connectable to the image forming apparatus 100.

Figure 2:
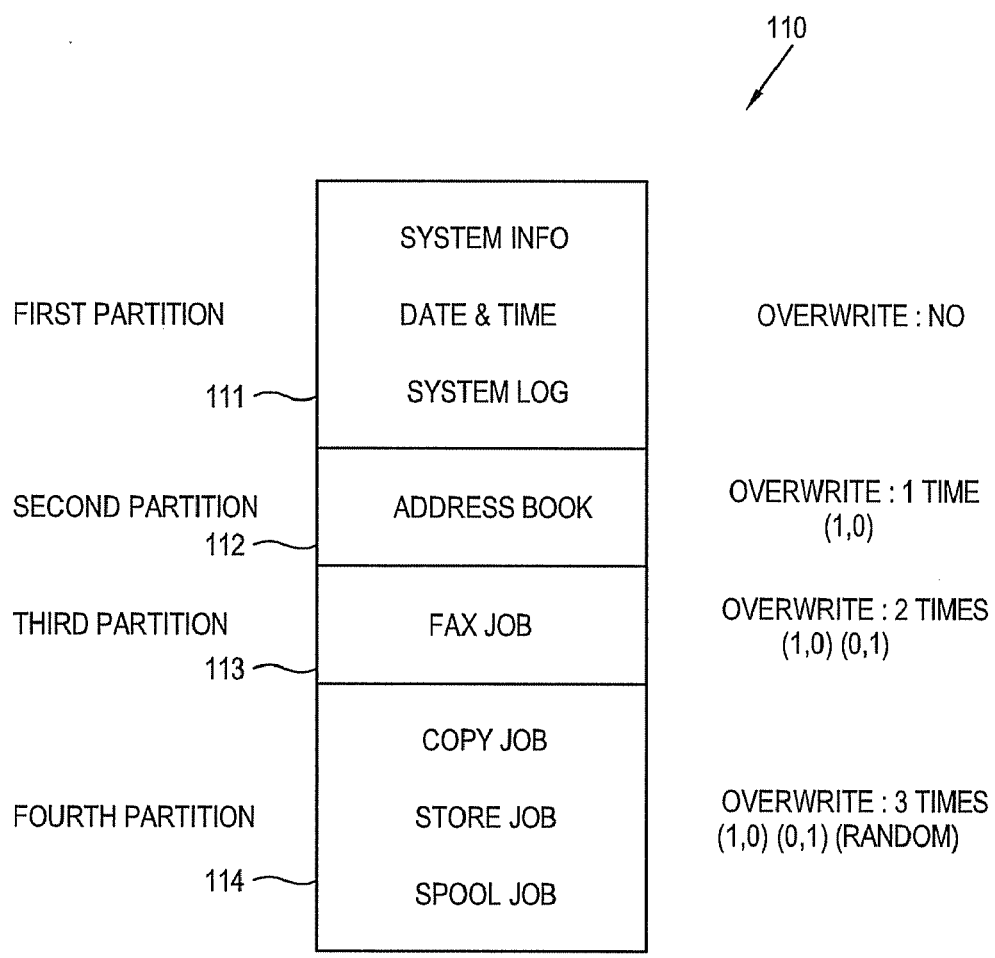
FIG. 2 illustrates an illustrative example of the storage unit which stores data stored in a plurality of partitions and is set to an overwriting option according to an exemplary embodiment of the present invention.

FIG. 2 illustrates an example of the storage unit 110 which stores data in a plurality of partitions and is set that an overwriting option according to an exemplary embodiment of the present invention.

As illustrated in FIG. 2, in the image forming apparatus 100, the storage unit 110 is divided into a plurality of partitions 111, 112, 113, and 114, and then it is determined which partitions data are to be stored in.

For example, if the storage unit 110 of the image forming apparatus 100 is divided into four partitions, as shown in FIG. 2, the storage unit 110 is configured to store data such as system information, date and time information, and system log in a first partition 111, address information in a second partition 112, fax data in a third partition 113, and data of copying, saving, and spooling in the a fourth partition 114, respectively.

Here, the number of partitions of the storage unit 110 and the kind of data stored by the partitions 111, 112, 113, and 114 are determined by either a default configuration or by a configuration selected by a user through the user interface 140 provided in the image forming apparatus 100.

The communication interface 120, as illustrated in FIG. 1, conducts data communication with the storage unit 110. In detail, the communication interface 120 transmits data to be stored to the storage unit 110 according to the control of the controller 160 and carries out communication corresponding to data writing and deleting instructions according to overwrite options.

The communication interface 120 may include a data cable to communicate with the storage unit 110 in the image forming apparatus 100, a wired/wireless communication module connectable with an external device, such as portable storage medium, via a local connection or a network connection by a certain protocol, a USB port, or the like.

Meanwhile, when overwriting options are configured by a host device (not shown) that may be locally connected or network-connected, the communication interface 120 carries out communication corresponding to instruction about the setup of overwriting options from the host device.

The image forming unit 130 forms an image to be printed on at least one sheet of paper based on print data when given a print instruction. Here, printing includes printing for a copy after scanning a document, printing received fax data, and printing data input from the outside via a host device including a server or stored inside or outside the image forming apparatus 100, e.g., an HDD or a USB memory.

The user interface 140 is input with the selection of a user to determine the number of partitions in the storage unit 110 and the kind of data to be stored by the partitions 111, 112, 113, and 114.

The user interface 140 includes a panel (key buttons) to display the functions of the image forming apparatus 100 or a graphic user interface (GUI) generated by the execution of an application and displayable on the display unit 150 so that a user can input a function.

Meanwhile, the image forming apparatus 100 of the present embodiment can configure an overwriting option to carry out overwriting for the respective partitions 111, 112, 113, and 114 of the storage unit 110. Here, overwriting is a process that when data is deleted from the storage unit 110, certain data is repeatedly overwritten on the space where the data has been deleted from. The more times overwriting is conducted, the more difficult it is to restore or recover previously stored data, thereby the possibility of leaking data is lowered and accordingly enhancing security performance. The overwriting option of the present embodiment refers to the number of overwriting performances, which includes zero, i.e., the case of not conducting overwriting.

With reference to FIG. 2, for example, the image forming apparatus 100 can configure the overwriting option so as to not carry out overwriting of data stored in the first partition 111 of the storage unit 110. Further, the image forming apparatus 100 can configure the overwriting option such that the partitions to carry out overwriting once for the data stored the second partition 112, twice for data stored in the third partition 113, and three times for data stored in the fourth partition 114.

Here, the overwriting option is configured according to the security level of data stored in each of the partitions, i.e., the security level may comprise either an importance of the data or the kind of data, or may comprise both the importance of the data and the kind of data.

In further detail, according to an exemplary embodiment of FIG. 2, the data such as system information and date and time information stored in the first partition 111 may require a relatively lower security level than the data stored in the second to fourth partitions 112, 113, and 114. In this case, the overwriting option is configured to not carry out overwriting if the data stored in the first partition 111 is deleted.

In the same manner, as illustrated in FIG. 2, in the image forming apparatus 100, the overwriting option is configured for the second partition 112, the third partition 113, and the fourth partition 114 of the storage unit 110 according to the importance of data stored in each of the partitions, i.e., a security level. Namely, triple overwriting is configured for the fourth partition which stores important data for a user such as data in copying, saving, and spooling, and double overwriting is configured for the third partition which stores fax data.

Also, the overwriting option configuration can be changed by an administrator or a user.

Meanwhile, the aforementioned overwriting option is performed through a user interface provided on a host device (not shown) such as a PC or a server connectable with the image forming apparatus 100 via the communication interface 120.

Accordingly, a variety of data can be stored in respective partitions having different security levels, thereby enhancing security performance and improving the processing speed of the apparatus.

The display unit 150 displays the configuration and the operation state of the image forming apparatus 100 to users and may display a GUI screen to display instructions inputted from the user. In further detail, the display unit 150 displays at least one of the kinds of stored data and overwriting options configured for the partitions 111, 112, 113, and 114 of the storage unit 110.

The display unit 150 may be a thin film transistor-liquid crystal display (TFT-LCD) having a driving unit (not shown) to drive the TFT-LCD, or other similar display units.

The controller 160, as illustrated in FIG. 1, generally controls the image forming apparatus 100. More specifically, the controller 160 controls an overwriting option to be a default configuration or a user configured configuration via the user interface 140 and conducts overwriting according to the overwriting option configured when data is deleted.

The present embodiment has been explained according to the case where different overwriting options are configured for a plurality of partitions into which the storage unit 110 has been divided, and the different overwriting options are applied differently according to data stored in the respective partitions. If necessary, however, overwriting options may be configured according to the kinds of data stored, regardless of the plurality of partitions. Also, if the image forming apparatus 100 serves a plurality of functions, overwriting options may be configured depending on the respective functions.

Figure 3:
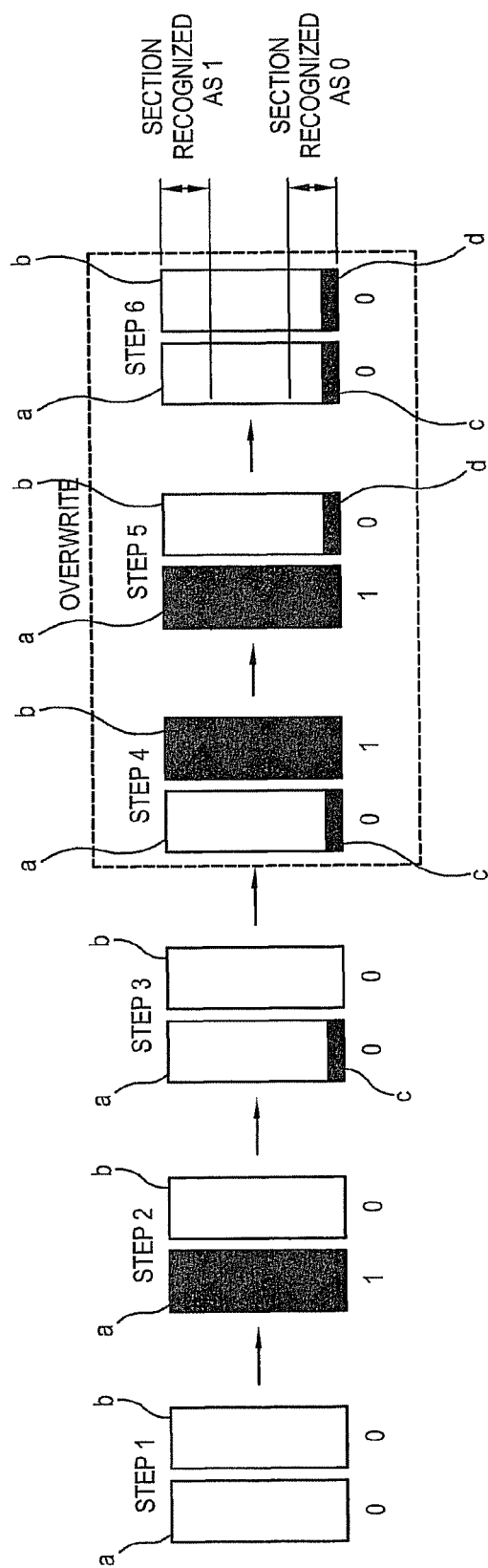
FIG. 3 illustrates an overwriting process according to an exemplary embodiment of the present invention.

FIG. 3 illustrates an overwriting process according to an exemplary embodiment of the present invention.

As illustrated in FIG. 3, in the case where there is a space (a, b) to store data in the storage unit 110 of the image forming apparatus 100 (STEP 1), when (1, 0) is written in the space (a, b) (STEP 2), the space (a, b) is divided into 1 and 0 by a voltage difference.

If the stored data is deleted from this space (a, b) to be (0, 0) (STEP 3), there is formed a section (c) where a voltage difference occurs. The deleted data can be restored by the section (c) where there is a voltage difference.

Here, if the image forming apparatus 100 configured to conduct overwriting three times on the space (a, b) where the data has been written, the controller 160 carries out overwriting that sequentially writes (0, 1), (1, 0), and (0, 0) (STEP 4, STEP 5, and STEP 5), as illustrated in FIG. 3, so that the initially written data cannot be restored.

Meanwhile, in configuring an overwriting option, the image forming apparatus 100, as shown in FIG. 2, can configure data to be written as (1, 0), (0, 1), or the like depending on the amount of times overwriting is conducted. When the image forming apparatus 100 is configured to conduct overwriting three times, data written on the final overwrite may be random.

In the image forming apparatus 100 with the foregoing configuration, an overwriting process in the storage unit 110 will be described with reference to FIGS. 4 and 5 as follows.

Figure 4:
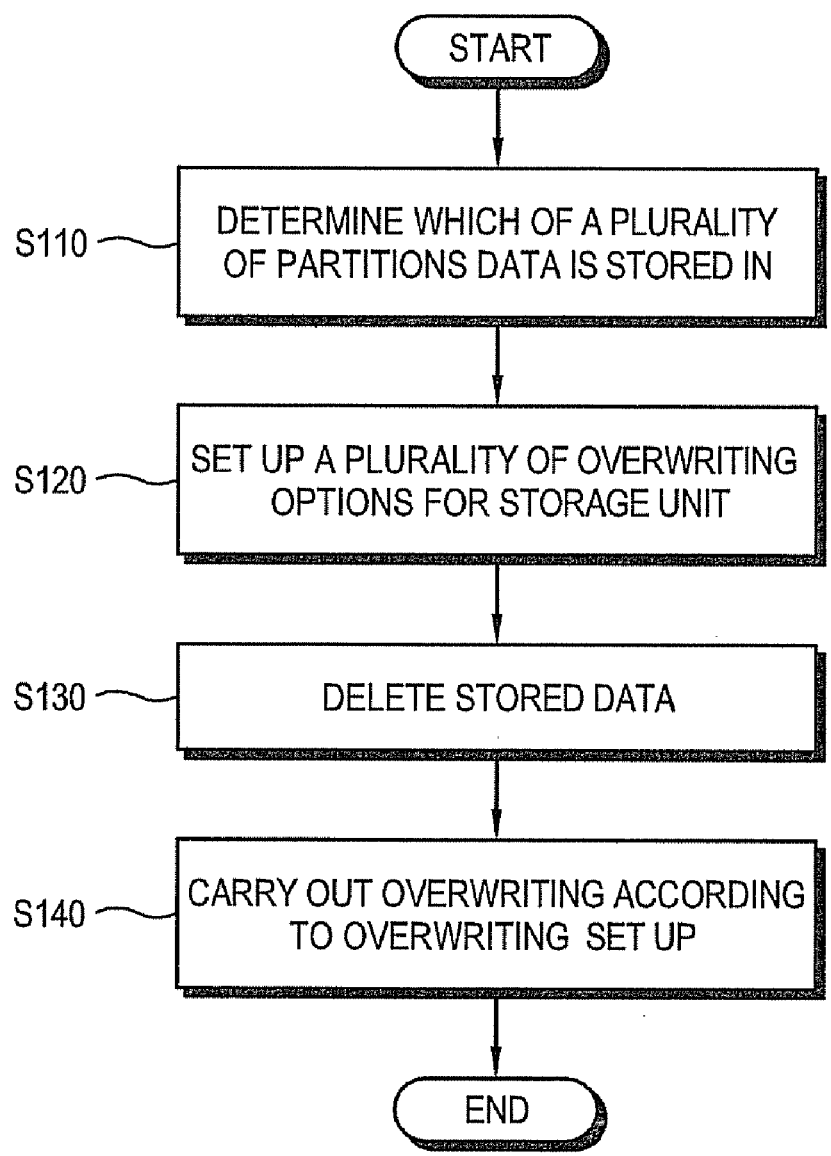
FIG. 4 is a flow chart to illustrate an overwriting method according to an exemplary embodiment of the present invention.

As illustrated in FIG. 4, the image forming apparatus 100 determines in which of a plurality of partitions 111, 112, 113, and 114 of the storage unit 110 a certain data is to be stored (S110). Here, the position where the data is stored can be determined by the selection of a user or by a default configuration.

Next, the image forming apparatus 100 configures a plurality of overwriting options for the storage unit 110 (S120). Here, the controller 160 can configure an overwriting option according to where the data is stored in one of the partitions 111, 112, 113, and 114, as determined at S110. The overwriting option of the present exemplary embodiment refers to the number of overwriting times, which includes zero, i.e., the case overwriting is not conducted. An overwriting option can be configured not only by the selection of a user or by a default configuration, but also by a user interface of a host device connectable with the image forming apparatus 100.

Next, when the data stored in the storage unit 110 is deleted (S130), the controller 160 carries out overwriting according to the overwriting option configured at S120 (S140).

Figure 5:
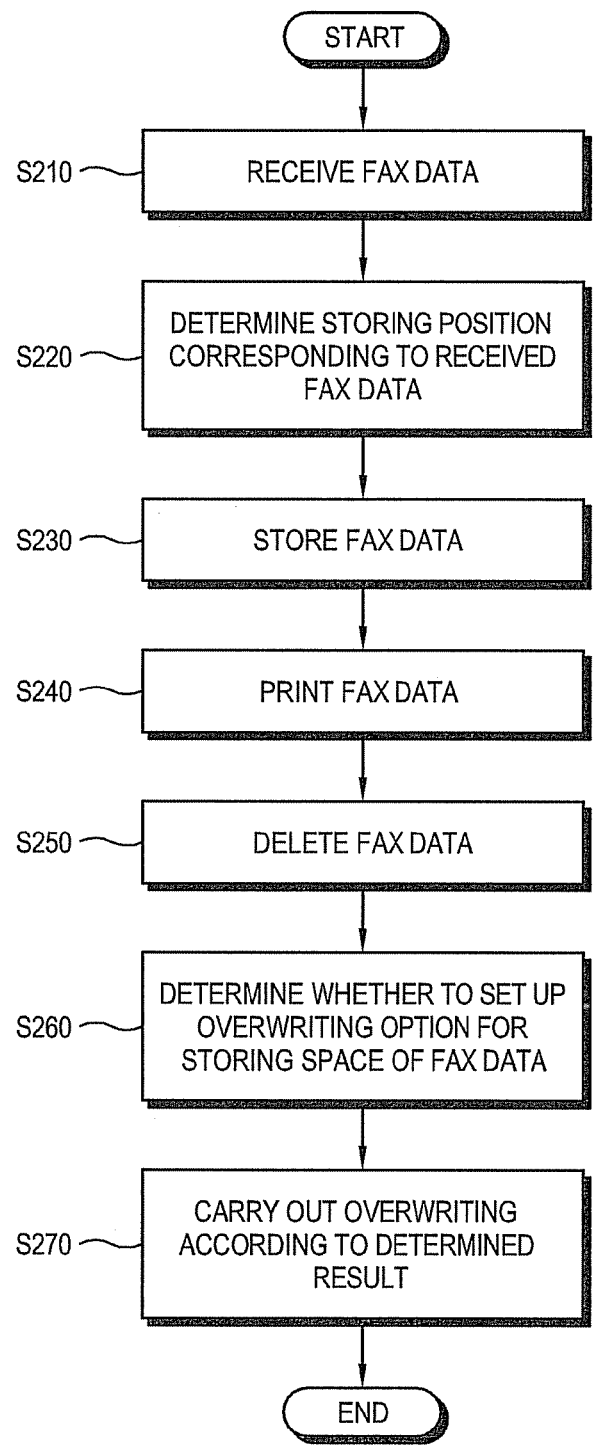
FIG. 5 is a flow chart to illustrate an illustrative example of carrying out overwriting in accordance with overwriting options set in the image forming apparatus according to an aspect of the present invention.

FIG. 5 is a flow chart illustrating an example of carrying out overwriting according to overwriting options configured in the image forming apparatus of the present exemplary embodiment.

When the image forming apparatus 100 is a multifunctional device capable of receiving a fax, it receives fax data from an external source (S210). The received fax data is saved as a temporary file for printing and then deleted when printing is done.

The controller 160 determines the saving position corresponding to the fax data received at S210 (S220). For example, the saving position may be the third partition 113 as is shown in FIG. 2.

The controller 160 stores the fax data in a specific partition of the storage unit 110 in accordance with the determination made at S220. Then, the controller 160 carries out printing of the saved fax data (S240).

When printing the fax data at S240, the controller 160 deletes the fax data that is saved as a temporary file (S250).

Here, the controller 160 determines whether to configure an overwriting option for the space partitioned for fax data (S260).

The controller 160 carries out overwriting on the basis of the determination made at S260.

Here, although the embodiment has been described with the case where data is saved as a temporary file, e.g., fax data, the present embodiment is applicable to the case where data produced from scanning, copying, or the like of the image forming apparatus is deleted. In addition, the present embodiment can be applied to a variety of applications such as portable equipment, navigation devices, MP3 players, or other such portable devices. as well as the image forming apparatus 100.

Accordingly, the image forming apparatus 100 of the present embodiment configures a plurality of overwriting options for the storage unit 110, thereby enhancing a security level according to the importance of data and improving the processing speed.

As described above, the image forming apparatus and a method of overwriting for the storage unit thereof according to the exemplary embodiments of the present invention configures a plurality of overwriting options for a storage unit and carries out overwriting according to an overwriting option corresponding to stored data when the stored data is deleted, thereby decreasing unnecessary load on the processor and improving the processing speed of the apparatus.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A method of overwriting data in a storage unit of an image forming apparatus comprising:
    configuring a plurality of overwriting options corresponding to data stored in the storage unit, wherein the storage unit comprises a plurality of partitions and the configuring of the plurality of overwriting options comprises configuring the overwriting options according to a partition where the data is stored;
    determining which of the plurality of partitions the data is to be stored according to a security level, wherein the security level is at least one of a level of importance and a kind of stored data;
    deleting the data stored in the storage unit according to a delete instruction; and
    overwriting data according to the configuration of the plurality of overwriting options corresponding to the data stored in the storage unit,
    wherein the plurality of overwriting options comprise the number of times overwriting occurs.

2. The method according to claim 1, wherein the overwriting options are configured differently for the different partitions.

3. The method according to claim 1, wherein the configuring the plurality of overwriting options comprises configuring the plurality of overwriting options according to the kind of the stored data.

4. The method according to claim 1, further comprising displaying the overwriting options configuration.

5. The method according to claim 1, wherein the plurality of overwriting options are changeable by an administrator or a user.

6. The method according to claim 1, wherein the configuring the plurality of overwriting options is carried out on a user interface of a host device.

7. An image forming apparatus comprising:
    a storage unit to store data, comprising a plurality of partitions;
    a communication interface to communicate with the storage unit;
    a controller to control a plurality of overwriting options corresponding to the stored data and to overwrite the stored data according to the plurality of overwriting options corresponding to the stored data when the stored data is deleted according to a delete instruction; and
    a display unit to display the configuration of the plurality of overwriting options
    wherein the controller configures the plurality of overwriting options according to a partition where the data is stored and determines which of the plurality of partitions the data is to be stored in according to a security level which is at least one of an importance of the stored data and the kind of the stored data.

8. The image forming apparatus according to claim 7, wherein the plurality of overwriting options are configured differently for the different partitions.

9. The image forming apparatus according to claim 7, wherein the controller configures the plurality of overwriting options according to the kind of the data.

10. The image forming apparatus according to claim 7, wherein the plurality of overwriting options comprises the number of times overwriting occurs.

11. The image forming apparatus according to claim 7, wherein the plurality of overwriting options are changeable by an administrator or a user.

12. A method of configuring overwriting options on a storage unit storing data of an image forming apparatus, the method comprising:
    partitioning the storage unit into a plurality of partitions;
    configuring a plurality of overwriting options according to security levels of the stored data; and
    configuring the plurality of partitions according to the plurality of overwriting options;
    overwriting stored data in a configured partition among the plurality of configured partitions a multiple of times, a single time, or not conducting overwriting, according to a configured overwriting option corresponding to a security level of the configured partition,
    writing data to one of the partitions of the storage unit according to the security levels of the stored data,
    wherein data of a security level are written to a respective partition.

13. The method of claim 12, further comprising determining the number of times overwriting occurs on the plurality of partitions of the storage unit according to the security level of the respective partition.

* * * * *